(12) United States Patent
Hardwick et al.

(10) Patent No.: US 12,430,309 B2
(45) Date of Patent: Sep. 30, 2025

(54) SYSTEMS AND METHODS FOR ANALYZING DISTINCT DATASETS WITH A COMMON INDEX

(71) Applicant: Intuitive Research and Technology Corporation, Huntsville, AL (US)

(72) Inventors: Andrew Craig Hardwick, Huntsville, AL (US); Kyle Jordan Russell, Huntsville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 14 days.

(21) Appl. No.: 18/397,565

(22) Filed: Dec. 27, 2023

(65) Prior Publication Data

US 2024/0232154 A1  Jul. 11, 2024

Related U.S. Application Data

(60) Provisional application No. 63/437,434, filed on Jan. 6, 2023.

(51) Int. Cl.
*G06F 16/22* (2019.01)
*G06F 16/23* (2019.01)
*G06F 16/28* (2019.01)

(52) U.S. Cl.
CPC .......... *G06F 16/22* (2019.01); *G06F 16/2358* (2019.01); *G06F 16/285* (2019.01)

(58) Field of Classification Search
CPC ..................................................... G06F 16/22
See application file for complete search history.

(56) References Cited

U.S. PATENT DOCUMENTS

| | | | | |
|---|---|---|---|---|
| 11,062,042 | B1* | 7/2021 | McKervey | G06F 16/137 |
| 11,706,769 | B2* | 7/2023 | Harrison | H04L 5/0053 |
| | | | | 370/329 |
| 2014/0036810 | A1* | 2/2014 | Harrison | H04L 5/0053 |
| | | | | 370/329 |
| 2014/0201744 | A1* | 7/2014 | Chu | G06N 5/04 |
| | | | | 718/100 |
| 2016/0196292 | A1* | 7/2016 | Munakata | G06F 16/35 |
| | | | | 707/738 |
| 2017/0286525 | A1* | 10/2017 | Li | G06N 20/00 |
| 2023/0345494 | A1* | 10/2023 | Harrison | H04L 5/0053 |

\* cited by examiner

*Primary Examiner* — Mohammad S Rostami
(74) *Attorney, Agent, or Firm* — Workman Nydegger

(57) ABSTRACT

A system for analyzing distinct datasets with a common index is configurable to (i) receive input data that includes a first set of data and a second set of data that share a common index; (ii) perform a clustering operation on the first set of data to generate a set of clustered data comprising groups representing related datapoints; (iii) identify a set of occurrences within the second set of data (where each occurrence is associated with a respective set of coordinates in the common index), (iv) for each of the set of occurrences: (a) localize search space(s) in the common index using the respective set of coordinates for the occurrence, and (b) facilitate analysis of group(s) of the set of clustered data that are located within the search space(s) to determine whether a relationship exists between the group(s) and the occurrence.

20 Claims, 9 Drawing Sheets

SYSTEMS AND METHODS FOR ANALYZING DISTINCT DATASETS WITH A COMMON INDEX

CROSS-REFERENCE TO RELATED APPLICATIONS

This application claims priority to U.S. Provisional Application No. 63/437,434, filed on Jan. 6, 2023, and entitled "SYSTEMS AND METHODS FOR ANALYZING DISTINCT DATASETS WITH A COMMON INDEX", the entirety of which is incorporated herein by reference for all purposes.

BACKGROUND

With recent technological advancements, electronic storage of data is ubiquitous and readily utilizable by individuals and enterprises/organizations. The accessibility/usability of electronic data storage has given rise to the acquisition of voluminous bodies of electronically stored sensor data, event/log data, and/or other types of data in various contexts. Such data can be acquired for various purposes, such as diagnostic, monitoring, interventive, and/or other purposes in various domains (e.g., mechanical, medical, security, research, commercial, and/or other domains).

Such voluminous stores of sensor data, event/log data, and/or other types of data have the potential to be utilized to provide various insights that may be valuable to various entities. However, interpreting and/or acting upon such large quantities of data is associated with many challenges, such as being time-consuming, complex, susceptible to errors, etc.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
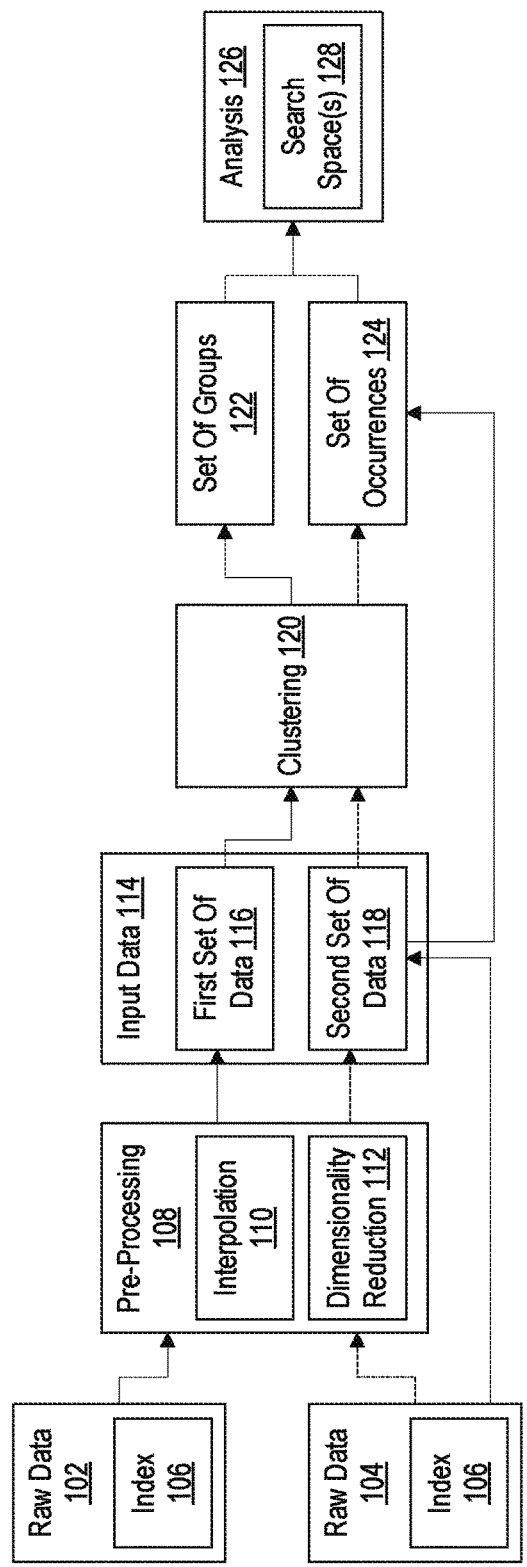
FIG. 1 illustrates example aspects of a data analysis system, in accordance with implementations of the present disclosure.

Disclosed embodiments are directed to systems, methods, devices, and/or techniques for facilitating analysis of distinct datasets that share a common index (or link or key).

As noted above, interacting with and/or acting upon large bodies of stored data (e.g., sensor data, event/log data, and/or others) is associated with many challenges. For instance, many systems that facilitate instrument and/or device maintenance capture sensor data over time. Such systems often also detect certain events and/or occurrences to facilitate maintenance of the instrument and/or device. Such systems may additionally be configured to log user input associated with diagnostic and/or maintenance/repair activities performed and/or findings associated therewith. Such data acquisition, over time, can result in an unwieldy amount of stored sensor data and/or event/log data. Enterprises may desire to interpret the stored data to obtain insights that may be valuable to the enterprise (e.g., by learning correlations between sensor readings and diagnostic occurrences, maintenance/repair requirements, etc.). However, manually analyzing and/or drawing conclusions from such voluminous data can prove complex for human actors (which can lead to errors), and human actors would be subject to their biases and/or experiences when interpreting such data (e.g., subject to preconceived notions about relationships between sensor data and events/occurrences).

At least some disclosed embodiments may be implemented to determine connections, correlations, patterns, and/or other relationships between components of different datasets that share a common index (e.g., between sensor data and event/log data, each of which may be commonly indexed by time). In one example, a system receives input data that includes a first set of data (e.g., sensor data) and a second set of data (e.g., event/log data) that both share a common index (e.g., time). Various preprocessing operations may be performed on one or more raw datasets to provide the input data, such as interpolation and/or dimensionality reduction operations. The system performs a clustering operation on the first set of data (e.g., sensor data) to generate a set of clustered data with groups representing related datapoints from the first set of data. The system also identifies a set of occurrences within the second set of data (e.g., event/log data of interest), with each occurrence being associated with a respective set of coordinates in the common index (e.g., a particular time or range of times of the occurrence).

Continuing with the above example, the system analyzes the set of clustered data from the first set of data and the set of occurrences from the second set of data (e.g., to determine one or more relationships therebetween). For instance, for each specific occurrence from the set of occurrences, the system may localize one or more search spaces (e.g., search windows) in the common index (e.g., time) using the coordinates in the common index associated with the specific occurrence (e.g., the time(s) in which the specific occurrence occurred). For instance, the center or endpoints of the search space(s) may be positioned according to the coordinates in the common index associated with the specific occurrence. The system may then analyze whether any groups from the set of clustered data are within the localized search space(s).

The presence of a group within the search space(s) localized in association with a specific occurrence (and/or characteristics of the search space(s) within which the group is present) may indicate aspects of a relationship or correlation between the group and the specific occurrence (e.g., especially where the group is present for different sets of search spaces associated with different instances of the set of occurrences). A relationship between the group and the specific occurrence may indicate a relationship between sensor data/readings associated with the group and the specific occurrence.

For instance, in the example of instrument and/or device maintenance, an enterprise may store event and/or log data that includes multiple instances of a particular type of event/log entry indicating that a particular component needs repair (e.g., such entries may be made pursuant to routine inspections). The enterprise may also store sensor data associated with the instrument/device of which the component needing repair is a part. Both the event/log entry data and the sensor data may share a common index of time (e.g., each sensor datapoint has a timestamp, and each event/log entry includes an associated time and/or date). The techniques disclosed herein may be implemented to utilize the sensor data and the event/log entry data as input data (e.g., after various pre-processing, such as interpolation, alignment, and/or dimensionality reduction processing) to generate groups of clustered data from the sensor data and to identify occurrences of interest from the event/log entry data (e.g., the occurrences of interest may comprise instances of event/log entries indicating that the particular component needs repair). Search spaces may be localized using temporal coordinates (i.e., in the shared index) of the various occurrences of interest. Clustered data groups from the sensor data that lie within search spaces localized for various occurrences of interest may then be identified as potentially related to the occurrences of interest. For instance, if clustered data groups associated with certain sensor readings appear within search spaces for multiple occurrences of interest, the sensor readings may be indicative of a potential cause of the occurrence of interest (e.g., in the example of aircraft maintenance, a system may detect that sensor readings associated with the aircraft passing through rough air may be identified as a potential cause of particular joints of the aircraft becoming loose and needing tightening).

Identified relationships/links between data of one dataset (e.g., sensor data) and data of another dataset (e.g., event/log data) may benefit enterprises in various ways, such as by informing beneficial policy changes, enabling prediction/anticipation of events/occurrences (e.g., resulting from detection of sensor patterns determined to be related to events/occurrences), providing cues to implement corrective/responsive protocols, facilitating retroactive modification of data (e.g., where an event with a known effect on sensor readings occurs in temporal proximity to detected sensor readings, the sensor readings may be corrected retroactively), and/or others. The principles discussed herein may advantageously enable detection of relationships between disparate datasets (with a shared index) in a manner that avoids human biases in interpreting the data.

Although at least some examples herein focus, in at least some respects, on the domain of instrument/device maintenance/repair, one will appreciate, in view of the present disclosure, that the principles discussed herein may be applied in other domains. Furthermore, although at least some examples discussed herein focus, in at least some respects, on implementations in which input data includes two datasets, any number of datasets may be utilized to detect relationships between components/features of the datasets. Still furthermore, although at least some examples discussed herein focus, in at least some respects, on input data in which one set includes discrete data (e.g., event/log entries) and the other set includes continuous data (e.g., sensor data), the principles discussed herein may be applied to detect relationships between components/features of different continuous datasets (e.g., both datasets may be clustered).

Having just described some of the various high-level features and benefits of the disclosed embodiments, attention will now be directed to the Figures, which illustrate various conceptual representations, architectures, methods, and/or supporting illustrations related to the disclosed embodiments.

Example Data Analysis System

FIG. 1 illustrates example aspects (e.g., inputs, operations) of a data analysis system 100 that may be utilized to facilitate analysis of distinct datasets that have a common index. In particular, FIG. 1 depicts raw data 102 and 104, which may for instance, be stored by an enterprise pursuant to activities of the enterprise. In the example of FIG. 1 (for ease of description), raw data 102 comprises sensor data (e.g., with continuous values), and raw data 104 comprises discrete event and/or log data. As noted above, other types of data are within the scope of the present disclosure (e.g., with both sets of raw data comprising continuous data, or both comprising discrete data).

FIG. 1 depicts an index 106 shared by both sets of raw data 102 and 104. The index 106 may comprise a common independent variable or coordinate space shared by data points of raw data 102 and 104. In some instances, the common independent variable is a temporal index (e.g., time indexed by any suitable units, such as seconds, minutes, hours, days, etc.), but the index 106 may take on other forms in accordance with the present disclosure.

In some instances, a data analysis system 100 performs pre-processing 108 on at least some of the raw data 102 and/or 104 to facilitate interpretation of the raw data 102 and 104 by the system. For example, the raw data 102 and/or 104 may include multiple data channels (e.g., for sensor data, multiple sensor channels), which can give rise to discrepancies in frequency and/or sampling alignment across data channels. To account for such discrepancies, the pre-processing 108 may include interpolation 110, which may be performed to address frequency and/or alignment discrepancies in the raw data 102 and/or the raw data 104. The interpolation 110 may take on various forms, such as, by way of non-limiting example, linear interpolation, nearest neighbor interpolation, polynomial interpolation, spline interpolation, Gaussian process interpolation, multivariate interpolation techniques, and/or others.

The pre-processing 108 may comprise additional or alternative operations, such as dimensionality reduction 112 and/or others. Dimensionality reduction 112 may be performed on raw data 102 and/or 104 (and/or interpolated data after performance of interpolation 110) to amplify the structure of the data for subsequent operations (e.g., clustering 120 and/or others). In some instance, the dimensionality reduction 112 utilizes uniform manifold approximation and projection (UMAP), although any suitable dimensionality reduction technique is within the scope of the present disclosure, such as, by way of non-limiting example, principal component analysis, non-negative matrix factorization, linear discriminant analysis, generalized discriminant analysis, missing values ratio, low variance filter, high correlation filter, backward feature elimination, forward feature construction, random forests, and/or any feature selection or feature extraction based approach(es).

FIG. 1 depicts the pre-processing 108 performed on raw data 102, which, in the example of FIG. 1, comprises sensor data (via a solid arrow extending from raw data 102 to the pre-processing 108). The pre-processing 108 provides or contributes to input data 114, which includes a first set of data 116 based upon the raw data 102 (e.g., pre-processed raw data 102) and a second set of data 118 based upon the raw data 104 (e.g., which may or may not be pre-processed, as indicated by the solid arrow extending from the raw data 104 to the second set of data 118 and the alternative dashed arrow extending from the raw data 104 through the pre-processing 108 toward the second set of data 118).

FIG. 1 illustrates that the data analysis system 100 may perform clustering 120 using at least part of the input data 114. In particular, FIG. 1 depicts the clustering 120 performed on the first set of data 116 (e.g., based upon the raw data 102, which, in the example of FIG. 1, comprises sensor data). The clustering 120 may cause data points of the first set of data 116 with similar features and/or properties to become grouped together, thereby providing a set of groups 122 based upon the first set of data 116 (which is based upon the raw data 102 comprising sensor data in the example of FIG. 1). The clustering 120 may utilize any suitable clustering technique(s), such as, by way of non-limiting example, k-means clustering, mean-shift clustering, density-based spatial clustering of applications with noise, expectation-maximization clustering, agglomerative hierarchical clustering, and/or others.

As depicted in FIG. 1, the data analysis system 100 may further determine a set of occurrences 124 based upon the second set of data 118 and/or the raw data 104 (e.g., event/log data). In some instances, the set of occurrences 124 include instances of an occurrence of interest for which investigation of relationships with the raw data 102 is desired. In one example, the set of occurrences 124 may include instances when an instrument/device had a particular state and/or action performed thereupon, and for which an investigation of linkage with sensor data (raw data 102 and/or derivatives thereof) is desired. In the example of FIG. 1, where the raw data 104 comprise discrete events/logs, the set of occurrences 124 may be selected from the raw data 104 and/or the second set of data 118 (as indicated by the solid arrow extending from the second set of data 118 to the set of occurrences 124). In some implementations, the set of occurrences 124 may be selected manually (e.g., based upon user input) and/or based upon one or more predefined rules (e.g., predefined categories for event/log data). For example, a user may provide user input at a user interface defining one or more pre-selected occurrences for which investigation of relationships with the raw data 102 is desired (e.g., a type of system state, error code, repair/maintenance flag, etc.). The set of occurrences 124 identified from the raw data 104 and/or the second set of data 118 may correspond to the one or more pre-selected occurrences. In some instances, such as where the raw data 104 comprises continuous data 104, the set of occurrences 124 may itself be determined via clustering 120 and/or other pre-processing operations.

In some implementations, each group of the set of groups 122 is associated with respective coordinates in the index 106. Similarly, each occurrence of the set of occurrences 124 may be associated with respective coordinates in the index 106. With the set of groups 122 and the set of occurrences 124 obtained, a data analysis system 100 may facilitate analysis 126 to determine relationships between the set of groups 122 (which is based upon raw data 102, or sensor data in the example of FIG. 1) and the set of occurrences 124 (which is based upon raw data 104, or event/log data in the example of FIG. 1). As will be described in more detail hereinafter, the analysis 126 may utilize search space(s) 128 localized using the coordinates (in the index 106) associated with the set of occurrences 124 to enable determination of relationships between the set of groups 122 and the occurrences.

Figure 2A:
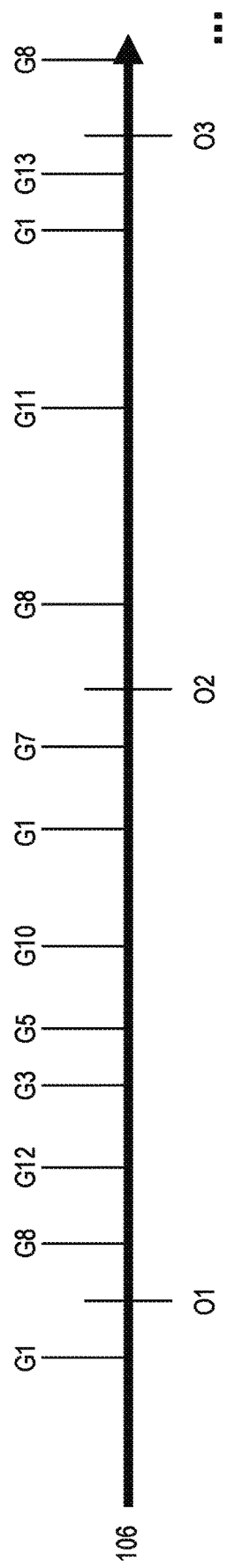
FIGS. 2A through 2D illustrate conceptual representations of analysis performed by a data analysis system, in accordance with implementations of the present disclosure.

FIGS. 2A through 2D illustrate conceptual representations of the analysis 126 facilitated by the data analysis system 100 using the search space(s) 128. In particular, FIG. 2A conceptually depicts the index 106, with groups of the set of groups 122 being arranged relative to the index 106 based upon their respective coordinates in the index 106. In FIG. 2A, the groups are labeled "G1", "G2", "G3", etc. FIG. 2A also conceptually depicts occurrences of the set of occurrences 124 arranged relative to the index 106 based upon their respective coordinates in the index. In FIG. 2A, the occurrences are labeled "O1", "O2", "O3", etc. The ellipsis indicates that any quantity of occurrences may be included in the set of occurrences 124, and any quantity of groups may be included in the set of groups 122. In the example of FIG. 2A, the index 106 represents time, and the occurrences represent multiple instances of the same or similar event/log that occur across time.

Figure 2B:
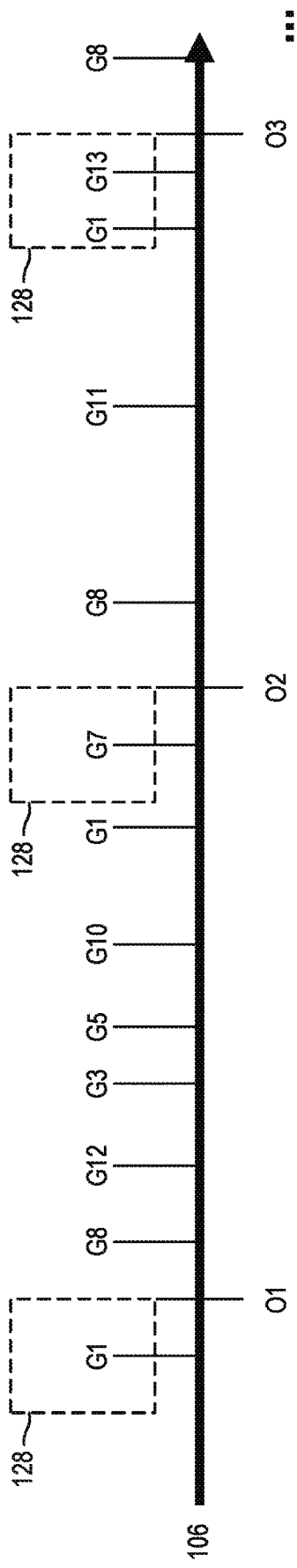

Using the index 106 shared by the occurrences and groups under analysis, the data analysis system 100 may localize search spaces relative to the coordinates of the occurrences in the index to determine groups that may be related to the occurrences. FIG. 2B illustrates a search space 128 extending leftward (e.g., backwards in time) from the temporal coordinates associated with each of the occurrences O1, O2, and O3 of the set of occurrences 124. With the search spaces 128 so localized, the presence of groups of the set of groups 122 within the search spaces 128 may indicate a relationship between the present groups and the set of occurrences 124.

In the example of FIG. 2B, the search space 128 localized relative to O1 includes G1, and the search space 128 localized relative to O3 includes G1, which may indicate that G1 is potentially related to the set of occurrences 124 (e.g., G1 and/or sensor data/readings associated therewith may be a potential cause of the set of occurrences 124, which O1 and O3 comprise instances of). The size of the search spaces 128 and/or the offset (in the index 106) between the detected groups (e.g., G1) may also indicate aspects of a relationship between the set of occurrences 124 (including O1 and O3) and G1 and/or sensor data/readings associated therewith (e.g., by indicating a potential amount of time that intervenes between detection of sensor data associated with G1 and an occurrence of the set of occurrences 124). In some instances, the quantity of instances in which a specific group (e.g., G1) is present within the search spaces 128 of the set of occurrences 124 (e.g., O1, O2, O3, etc.) can indicate aspects of the relationship between the specific group and the set of occurrences 124.

Figure 2C:
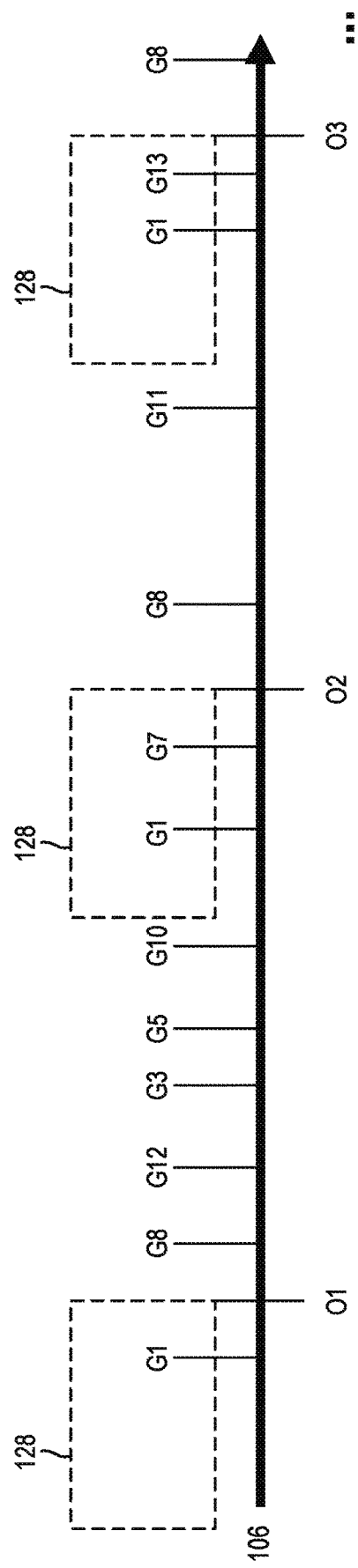

In some instances, multiple different search spaces of different sizes are localized relative to the occurrences of the set of occurrences 124 to improve the detection of relationships between the set of occurrences 124 and groups of the set of groups 122. FIG. 2C illustrates larger search spaces 128 localized relative to the occurrences O1, O2, and O3. In the example of FIG. 2C, all of the search spaces localized relative to O1, O2, and O3 include G1, which may add confidence to the indication of coherency between G1 and the set of occurrences 124. Any number of search spaces 128 (e.g., of varying sizes, localization configuration, and/or other characteristics) localized using coordinates (in the index 106) of the occurrences of the set of occurrences 124 may be utilized as part of the analysis of the groups of the set of groups 122 relative to the occurrences. In some instances, the size of the search spaces 128 of the set of occurrences 124 (e.g., O1, O2, O3, etc.) within which a specific group (e.g., G1) is determined to be present can indicate aspects of the relationship between the specific group and the set of occurrences 124.

Figure 2D:
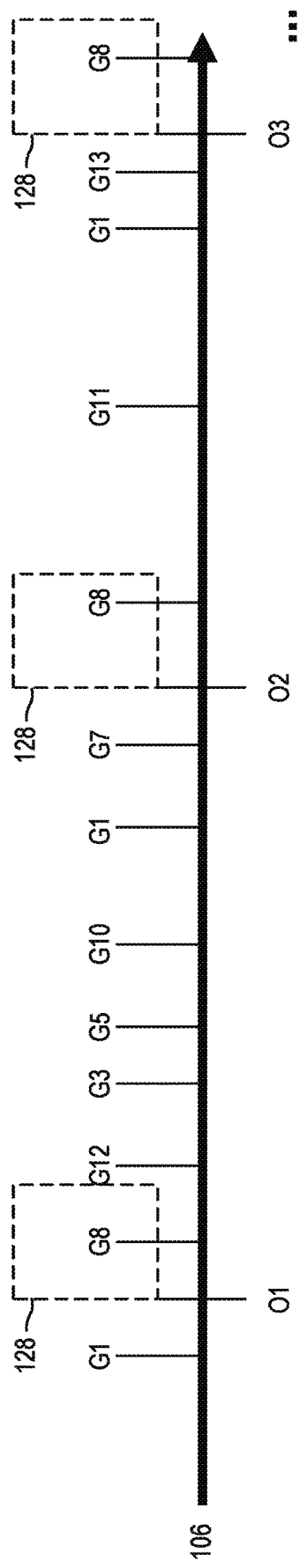

Although FIGS. 2B and 2C illustrate examples in which the search spaces 128 extend from the temporal coordinates of the occurrences of the set of occurrences 124 in a particular direction (e.g., backwards in time), one will appreciate that other configurations are within the scope of the present disclosure. For example, FIG. 2D illustrates an example in which the search spaces 128 extend forward from the coordinates (in the index) of the occurrences of the set of occurrences 124. In the example of FIG. 2D, all of the search spaces localized on the occurrences of the set of occurrences 124 encompass G8 of the set of groups 122, which may indicate a relationship between G8 and the set of occurrences (e.g., sensor data/readings/states associated with G8 may be caused by the set of occurrences 124). In some instances, the localization configuration of the search spaces 128 of the set of occurrences 124 (e.g., O1, O2, O3, etc.) within which a specific group (e.g., G8) is determined to be present can indicate aspects of the relationship between the specific group and the set of occurrences 124. The localization configuration of search spaces can indicate, for example, whether and which endpoints of the search spaces are aligned with the occurrences (in the common index), or whether the search spaces are centered on the occurrences (in the common index). In some instances, the localization configuration for localizing the search spaces 128 relative to the set of occurrences 124 is defined by user input (e.g., a user-defined setting/parameter).

Other search space localization configurations than those shown in FIGS. 2A-2D are within the scope of the present disclosure (e.g., with search spaces centered on coordinates of occurrences). In some implementations, multiple different search space sizes and/or localization configurations may be utilized for analysis of a set of occurrences 124 and a set of groups 122 with a shared index 106. For instance, a data analysis system 100 may iterate through multiple search space size and/or localization configurations (e.g., with endpoints of the search spaces aligned with occurrences, or with the search spaces centered on the occurrences) pursuant to analysis 126 of the set of groups 122 with respect to the set of occurrences 124 using the search space(s) 128 (e.g., to identify groups of the set of groups 122 that are related to the set of occurrences 124).

In some implementations, a data analysis system 100 performs analysis 126 as conceptually described hereinabove with reference to FIGS. 1 through 2D to identify groups from the set of groups 122 positioned within search spaces 128 associated with occurrences of the set of occurrences 124. Based on the analysis 126 using the search spaces 128, the set of groups 122, the set of occurrences 124, and the common index 106 (e.g., based on the presence and/or characteristics of groups within search spaces localized on occurrences), the data analysis system 100 can assign labels to groups of the set of groups 122 (and/or sensor data/features associated with the groups). The labels can comprise relatedness classifications that indicate whether groups of the set of groups 122 are related (or potentially related) or unrelated to the set of occurrences 124. In some instances, the labels comprise relatedness scores for groups of the set of groups 122 (and/or sensor data/features associated with the groups) indicating relatedness of the groups to the set of occurrences 124. Such labels (e.g., relatedness classifications, relatedness scores) provided by a data analysis system 100 may include confidence measures associated therewith.

The labels assigned to a group of the set of groups 122 can be generated based on various factors/inputs, such as, by way of non-limiting example, whether the group is present within one or more search spaces associated with the set of occurrences 124, the quantity of instances in which the group is present within one or more search spaces associated with the set of occurrences 124, the proximity of the group (in the common index) to the set of occurrences 124 within each search space, the consistency of the relative positioning of the group (in the common index) to the set of occurrences 124 within each search space, the size of the search spaces of the set of occurrences 124 within which the group is determined to be present, the localization configuration of the search spaces of the set of occurrences 124 within which the group is determined to be present, and/or other factors.

A data analysis system 100 may perform various actions using the labels (e.g., relatedness classifications, relatedness scores), such as, by way of non-limiting example, generating a report (e.g., indicating relatedness scores and/or classifications for groups and/or sensor data/features/states; indicating sensor data/features/states affected by an event/occurrence), recommending (and/or automatically implementing) policy changes (e.g., to trigger a notification upon detection of sensor data/features/states determined to be related to an event/occurrence; to recommend a modification to a policy or performance of a task to avoid causing sensor data/features/states to be detected), recommending (and/or automatically implementing) data modifications (e.g., retroactive modifications to sensor data/features/states based upon known aspects of a detected event that is determined to be related to the sensor data/features), and/or others.

Although the examples shown in FIGS. 2A through 2D include an index 106 with particular dimensionality (e.g., a single-dimensional common index of time), an index 106 common to a set of groups 122 and a set of occurrences 124 may comprise any dimensionality (e.g., a multi-dimensional common index). Similarly, although the search spaces 128 shown in FIGS. 2A through 2D have particular dimensionality, shape, and/or other characteristics, the search spaces 128 may comprise any dimensionality, shape, and/or other characteristics in accordance with the present disclosure.

In some instances, the analysis 126 comprises presenting a representation of the set of groups 122 in conjunction with the set of occurrences 124 on a user interface to enable a user (e.g., a data analyst/scientist) to draw correlations or associations between groups of the set of groups 122 and the set of occurrences 124. The representation can depict the set of groups 122 and the set of occurrences 124 positioned according to their respective coordinates in the common index (e.g., the common index being represented as a common axis or dimension in the representation). The representation can depict the search space(s) 128 localized on the set of occurrences 124. In some instances, display of the search space(s) 128 can be selectively modified, such as by providing user-interactable functionality for enabling/disabling display of the search space(s) 128, shifting of the search spaces (e.g., changing the alignment, in the common index, of the search spaces with their respective occurrences, such as changing the search spaces from having an endpoint aligned with the occurrence to being centered about the occurrence in the common index), enlarging/shrinking of the search spaces, etc. The presentation of the set of groups 122, the set of occurrences 124, and/or the search space(s) 128 can conceptually correspond to the depiction of groups, occurrences, and search spaces of FIGS. 2A through 2D.

The presentation of the set of groups 122, the set of occurrences 124, and/or the search space(s) 128 can enable a user to assess proximity (in the common index) of groups of the set of groups 122 to the search space(s) 128 associated with the set of occurrences 124, which can enable users to draw associations and/or correlations between the groups of the set of groups 122 and the set of occurrences 124. In some implementations, the groups of the set of groups 122 may be presented with user interface functionality for highlighting or otherwise visually emphasizing specific groups of the set of groups 122, enabling the user to readily ascertain potential correlations between highlighted/emphasized groups and the set of occurrences 124 presented on the user interface.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
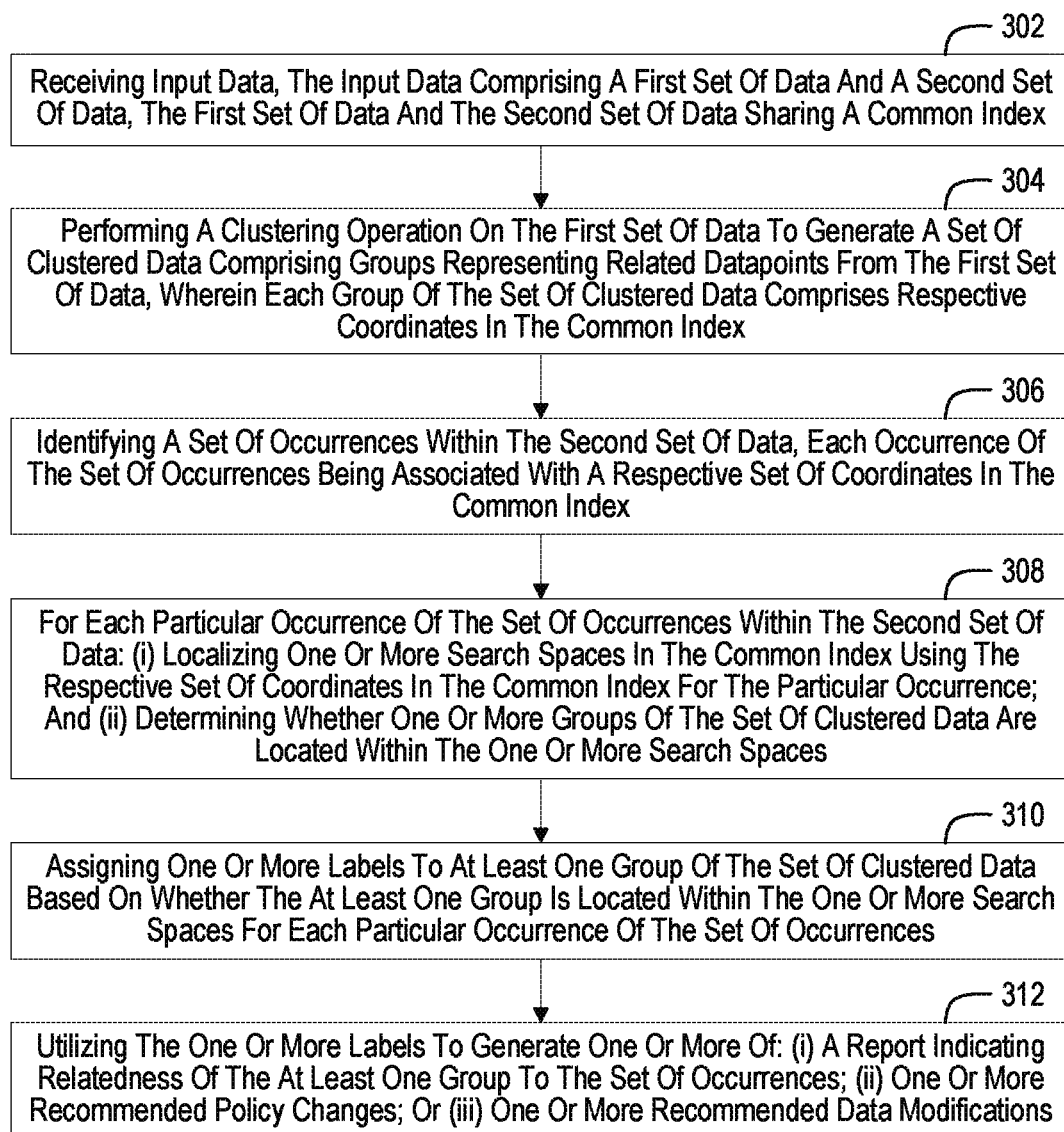
FIGS. 3, 4, and 5 illustrate example flow diagrams depicting acts associated with analyzing distinct datasets with a common index, in accordance with implementations of the present disclosure.
Figure 4:
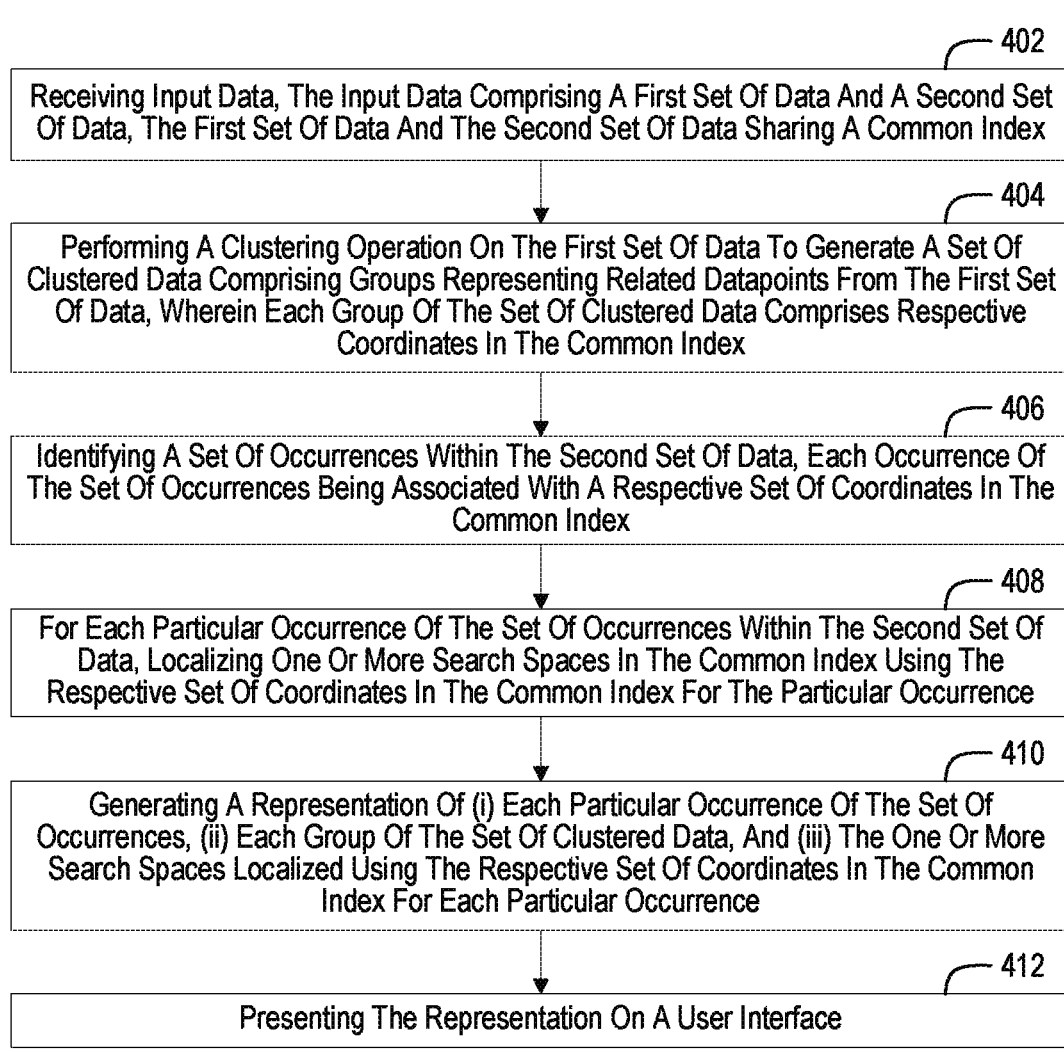
Figure 5:
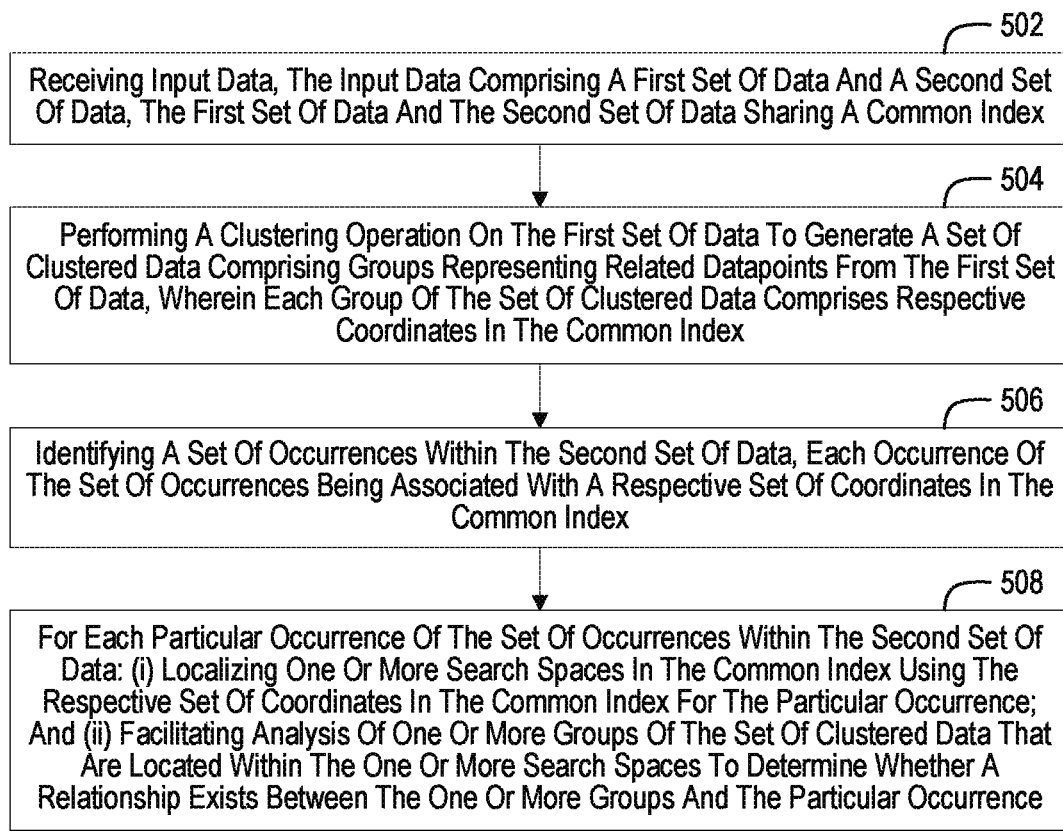

FIGS. 3, 4, and 5 illustrate example flow diagrams 300, 400, and 500, respectively, depicting acts associated with analyzing distinct datasets with a common index (e.g., utilizing a data analysis system 100).

Act 302 of flow diagram 300 of FIG. 3 includes receiving input data, the input data comprising a first set of data and a second set of data, the first set of data and the second set of data sharing a common index. In some instances, the first set of data comprises sensor data captured via one or more sensors (e.g., continuous numerical values). In some implementations, the second set of data comprises event or log data (e.g., discrete or categorical data). In some examples, the common index comprises a temporal index.

Act 304 of flow diagram 300 includes performing a clustering operation on the first set of data to generate a set of clustered data comprising groups representing related datapoints from the first set of data, wherein each group of the set of clustered data comprises respective coordinates in the common index. In some instances, prior to performing the clustering operation of act 304, one or more pre-processing operations are performed on the first set of data. In some implementations, the one or more pre-processing operations comprise data interpolation. In some examples, the one or more pre-processing operations comprise dimensionality reduction.

Act 306 of flow diagram 300 includes identifying a set of occurrences within the second set of data, each occurrence of the set of occurrences being associated with a respective set of coordinates in the common index. In some instances, the set of occurrences identified within the second set of data correspond to one or more pre-selected occurrences defined by user input.

Act 308 of flow diagram 300 includes, for each particular occurrence of the set of occurrences within the second set of data: (i) localizing one or more search spaces in the common index using the respective set of coordinates in the common index for the particular occurrence; and (ii) determining whether one or more groups of the set of clustered data are located within the one or more search spaces. In some implementations, the one or more search spaces are localized using the respective set of coordinates in the common index for the particular occurrence in accordance with one or more localization configurations defined by user input.

Act 310 of flow diagram 300 includes assigning one or more labels to at least one group of the set of clustered data based on whether the at least one group is located within the one or more search spaces for each particular occurrence of the set of occurrences. In some examples, the one or more labels comprise one or more relatedness classifications or one or more relatedness scores. In some instances, the one or more labels are defined based on one or more of: (i) a quantity of instances in which the at least one group is located within the one or more search spaces for the set of occurrences; (ii) a proximity of the at least one group to the set of occurrences within the one or more search spaces; (iii) a consistence of relative positioning of the at least one group to the set of occurrences within the one or more search spaces; (iv) a search space size associated with the one or more search spaces; or (v) a localization configuration associated with the one or more search spaces.

Act 312 of flow diagram 300 includes utilizing the one or more labels to generate one or more of: (i) a report indicating relatedness of the at least one group to the set of occurrences; (ii) one or more recommended policy changes; or (iii) one or more recommended data modifications.

Act 402 of flow diagram 400 of FIG. 4 includes receiving input data, the input data comprising a first set of data and a second set of data, the first set of data and the second set of data sharing a common index. In some instances, the first set of data comprises sensor data captured via one or more sensors (e.g., continuous numerical values). In some implementations, the second set of data comprises event or log data (e.g., discrete or categorical data). In some examples, the common index comprises a temporal index.

Act 404 of flow diagram 400 includes performing a clustering operation on the first set of data to generate a set of clustered data comprising groups representing related datapoints from the first set of data, wherein each group of the set of clustered data comprises respective coordinates in the common index. In some instances, prior to performing the clustering operation of act 404, one or more pre-processing operations are performed on the first set of data. In some implementations, the one or more pre-processing operations comprise data interpolation. In some examples, the one or more pre-processing operations comprise dimensionality reduction.

Act 406 of flow diagram 400 includes identifying a set of occurrences within the second set of data, each occurrence of the set of occurrences being associated with a respective set of coordinates in the common index. In some instances, the set of occurrences identified within the second set of data correspond to one or more pre-selected occurrences defined by user input.

Act 408 of flow diagram 400 includes, for each particular occurrence of the set of occurrences within the second set of data, localizing one or more search spaces in the common index using the respective set of coordinates in the common index for the particular occurrence.

Act 410 of flow diagram 400 includes generating a representation of (i) each particular occurrence of the set of occurrences, (ii) each group of the set of clustered data, and (iii) the one or more search spaces localized using the respective set of coordinates in the common index for each particular occurrence.

Act 412 of flow diagram 400 includes presenting the representation on a user interface. In some implementations, presenting the representation on the user interface comprises providing user-interactable elements that enable selective modification of the one or more search spaces.

Act 502 of flow diagram 500 of FIG. 5 includes receiving input data, the input data comprising a first set of data and a second set of data, the first set of data and the second set of data sharing a common index. In some instances, the first set of data comprises sensor data captured via one or more sensors (e.g., continuous numerical values). In some implementations, the second set of data comprises event or log data (e.g., discrete or categorical data). In some examples, the common index comprises a temporal index.

Act 504 of flow diagram 500 includes performing a clustering operation on the first set of data to generate a set of clustered data comprising groups representing related datapoints from the first set of data, wherein each group of the set of clustered data comprises respective coordinates in the common index. In some instances, prior to performing the clustering operation of act 504, one or more pre-processing operations are performed on the first set of data. In some implementations, the one or more pre-processing operations comprise data interpolation. In some examples, the one or more pre-processing operations comprise dimensionality reduction.

Act 506 of flow diagram 500 includes identifying a set of occurrences within the second set of data, each occurrence of the set of occurrences being associated with a respective set of coordinates in the common index. In some instances, the set of occurrences identified within the second set of data correspond to one or more pre-selected occurrences defined by user input.

Act 508 of flow diagram 500 includes, for each particular occurrence of the set of occurrences within the second set of data: (i) localizing one or more search spaces in the common index using the respective set of coordinates in the common index for the particular occurrence; and (ii) facilitating analysis of one or more groups of the set of clustered data that are located within the one or more search spaces to determine whether a relationship exists between the one or more groups and the particular occurrence.

Additional Details Related to Implementing the Disclosed Embodiments

Figure 6:
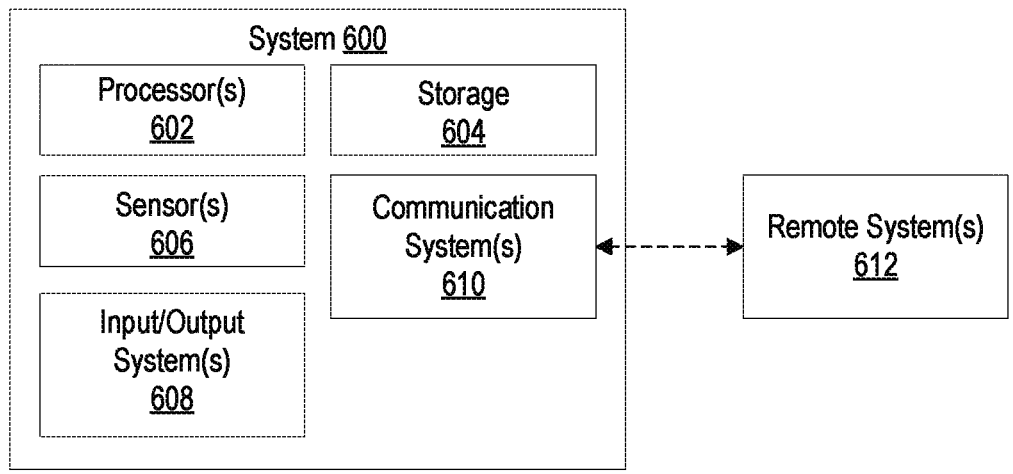
FIG. 6 illustrates an example system that may comprise or implement one or more disclosed embodiments.

FIG. 6 illustrates example components of a system 600 that may comprise or implement aspects of one or more disclosed embodiments. For example, FIG. 6 illustrates an implementation in which the system 600 includes processor(s) 602, storage 604, sensor(s) 606, I/O system(s) 608, and communication system(s) 610. Although FIG. 6 illustrates a system 600 as including particular components, one will appreciate, in view of the present disclosure, that a system 600 may comprise any number of additional or alternative components.

The processor(s) 602 may comprise one or more sets of electronic circuitries that include any number of logic units, registers, and/or control units to facilitate the execution of computer-readable instructions (e.g., instructions that form a computer program). Such computer-readable instructions may be stored within storage 604. The storage 604 may comprise physical system memory and may be volatile, non-volatile, or some combination thereof. Furthermore, storage 604 may comprise local storage, remote storage (e.g., accessible via communication system(s) 610 or otherwise), or some combination thereof. Additional details related to processors (e.g., processor(s) 602) and computer storage media (e.g., storage 604) will be provided hereinafter.

As will be described in more detail, the processor(s) 602 may be configured to execute instructions stored within storage 604 to perform certain actions. In some instances, the actions may rely at least in part on communication system(s) 610 for receiving data from remote system(s) 612, which may include, for example, separate systems or computing devices, sensors, and/or others. The communications system(s) 610 may comprise any combination of software or hardware components that are operable to facilitate communication between on-system components/devices and/or with off-system components/devices. For example, the communications system(s) 610 may comprise ports, buses, or other physical connection apparatuses for communicating with other devices/components. Additionally, or alternatively, the communications system(s) 610 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 6 illustrates that a system 600 may comprise or be in communication with sensor(s) 606. Sensor(s) 606 may comprise any device for capturing or measuring data representative of perceivable phenomenon. By way of non-limiting example, the sensor(s) 606 may comprise one or more image sensors, microphones, thermometers, barometers, magnetometers, accelerometers, gyroscopes, and/or others.

Furthermore, FIG. 6 illustrates that a system 600 may comprise or be in communication with I/O system(s) 608. I/O system(s) 608 may include any type of input or output device such as, by way of non-limiting example, a display, a touch screen, a mouse, a keyboard, a controller, and/or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable recording media, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for analyzing distinct datasets with a common index, comprising:
    one or more processors; and
    one or more computer-readable recording media that store instructions that are executable by the one or more processors to configure the system to:
    receive input data, the input data comprising a first set of data and a second set of data, the first set of data and the second set of data sharing a common index;
    perform a clustering operation on the first set of data to generate a set of clustered data comprising groups representing related datapoints from the first set of data, wherein each group of the set of clustered data comprises a respective first set of coordinates in the common index;
    identify a set of occurrences within the second set of data, each occurrence of the set of occurrences being associated with a respective second set of coordinates in the common index;
    for each particular occurrence of the set of occurrences within the second set of data:
    localize one or more search spaces in the common index using relative to the respective second set of coordinates in the common index for the particular occurrence; and
    determine whether the respective first set of coordinates in the common index of one or more groups of the set of clustered data are located within the one or more search spaces in the common index; and assign one or more labels to at least one group of the one or more groups of the set of clustered data based on whether the respective first set of coordinates in the common index of the at least one group is located within the one or more search spaces for the set of occurrences.

2. The system of claim 1, wherein the first set of data comprises sensor data captured via one or more sensors.

3. The system of claim 1, wherein the second set of data comprises event or log data.

4. The system of claim 1, wherein the common index comprises a temporal index.

5. The system of claim 1, wherein the instructions are executable by the one or more processors to further configure the system to, prior to performing the clustering operation on the first set of data, perform one or more preprocessing operations on the first set of data.

6. The system of claim 5, wherein the one or more pre-processing operations comprise data interpolation.

7. The system of claim 5, wherein the one or more pre-processing operations comprise dimensionality reduction.

8. The system of claim 1, wherein the set of occurrences identified within the second set of data correspond to one or more pre-selected occurrences defined by user input.

9. The system of claim 1, wherein the one or more search spaces are localized relative to the respective second set of coordinates in the common index for the particular occurrence in accordance with one or more localization configurations defined by user input.

10. The system of claim 1, wherein the one or more labels comprise one or more relatedness classifications or one or more relatedness scores.

11. The system of claim 10, wherein the one or more labels are defined based on one or more of:
 a quantity of instances in which the respective first set of coordinates in the common index of the at least one group is located within the one or more search spaces for the set of occurrences;
 a proximity of the respective first set of coordinates in the common index of the at least one group to the set of occurrences within the one or more search spaces;
 a consistency of relative positioning of the respective first set of coordinates in the common index of the at least one group to the set of occurrences within the one or more search spaces;
 a search space size associated with the one or more search spaces; or a localization configuration associated with the one or more search spaces.

12. The system of claim 1, wherein the instructions are executable by the one or more processors to configure the system to utilize the one or more labels to generate one or more of:
 a report indicating relatedness of the at least one group to the set of occurrences;
 one or more recommended policy changes; or one or more recommended data modifications.

13. A system for analyzing distinct datasets with a common index, comprising:
 one or more processors; and
 one or more computer-readable recording media that store instructions that are executable by the one or more processors to configure the system to:
 receive input data, the input data comprising a first set of data and a second set of data, the first set of data and the second set of data sharing a common index;
 perform a clustering operation on the first set of data to generate a set of clustered data comprising groups representing related datapoints from the first set of data, wherein each group of the set of clustered data comprises a respective first set of coordinates in the common index;
 identify a set of occurrences within the second set of data, each occurrence of the set of occurrences being associated with a respective second set of coordinates in the common index;
 for each particular occurrence of the set of occurrences within the second set of data, localize one or more search spaces in the common index using relative to the respective second set of coordinates in the common index for the particular occurrence;
 generate a representation of (i) each particular occurrence of the set of occurrences, (ii) each group of the set of clustered data, and (iii) the one or more search spaces localized relative to the respective second set of coordinates in the common index for each particular occurrence, wherein the representation indicates whether one or more respective first sets of coordinates in the common index of one or more groups of the set of clustered data are located within the one or more search spaces in the common index; and present the representation on a user interface.

14. The system of claim 13, wherein the first set of data comprises sensor data captured via one or more sensors, and wherein the second set of data comprises event or log data.

15. The system of claim 13, wherein the common index comprises a temporal index.

16. The system of claim 13, wherein the instructions are executable by the one or more processors to further configure the system to, prior to performing the clustering operation on the first set of data, perform one or more pre-processing operations on the first set of data.

17. The system of claim 13, wherein the set of occurrences identified within the second set of data correspond to one or more pre-selected occurrences defined by user input.

18. The system of claim 13, wherein the one or more search spaces are localized relative to the respective second set of coordinates in the common index for the particular occurrence in accordance with one or more localization configurations defined by user input.

19. The system of claim 13, wherein presenting the representation on the user interface comprises providing user-interactable elements that enable selective modification of the one or more search spaces.

20. A system for analyzing distinct datasets with a common index, comprising:
 one or more processors; and
 one or more computer-readable recording media that store instructions that are executable by the one or more processors to configure the system to:
 receive input data, the input data comprising a first set of data and a second set of data, the first set of data and the second set of data sharing a common index;
 perform a clustering operation on the first set of data to generate a set of clustered data comprising groups representing related datapoints from the first set of data, wherein each group of the set of clustered data comprises respective first set of coordinates in the common index;
 receive user input identifying a set of occurrences within the second set of data, each occurrence of the set of occurrences being associated with a respective second set of coordinates in the common index;
 receive user input defining one or more localization configurations; and
 for each particular occurrence of the set of occurrences within the second set of data:
 localize one or more search spaces in the common index relative to the respective second set of coordinates in the common index for the particular occurrence, wherein the one or more search spaces are localized relative to the respective second set of coordinates in the common index in accordance with the one or more localization configurations;
 generate a representation of (i) each particular occurrence of the set of occurrences, (ii) each group of the set of clustered data, and (iii) the one or more search spaces localized relative to the respective second set of coordinates in the common index for each particular occurrence, wherein the representation indicates whether one or more respective first sets of coordinates in the common index of one or more groups of the set of clustered data are located within the one or more search spaces in the common index; and present the representation on a user interface.

\* \* \* \* \*